UNITED STATES PATENT OFFICE.

RAYMOND WELCH TUNNELL, OF PHILADELPHIA, PENNSYLVANIA.

VEGETABLE GLUE OR ADHESIVE.

1,266,354.	Specification of Letters Patent.	Patented May 14, 1918.

No Drawing.	Application filed November 9, 1917. Serial No. 201,118.

*To all whom it may concern:*

Be it known that I, RAYMOND W. TUNNELL, a citizen of the United States, and a resident of Philadelphia, in the county of Philadelphia and State of Pennsylvania, have invented a new and Improved Vegetable Glue or Adhesive, of which the following is a full, clear, and exact description.

The object of the invention is to provide an improved adhesive suitable for wood work, bill posting, size making, etc.

My composition belongs to that large class of adhesives of vegetable origin produced from starch which has been modified or hydrolyzed by the action of acids or alkalis on the aqueous solution. The resultant product is a degenerated starch glue with increased adhesiveness.

The object of my invention, however, is to increase the binding power of previously known starch glues, making the same more waterproof, and enhancing the appearance.

In preparing glue it has been the custom to treat a mixture of starch and water with a certain percentage of caustic alkali in order to make a viscid, adhesive paste; but the alkali affects the starch and forms substances such as lactic or mucic acids, or compounds of similar nature, which become apparent when the paste is heated by the resulting brown color of the paste. The formation of such compounds in the paste seems to decrease the strength of the same.

Since vegetable glue acts more like a cement than a true adhesive, it is desirable to make the paste more waterproof. This I obtain by forming in the body of the dried paste some insoluble compounds. To this end, I add a small percentage of a salt to the solution of the starch mixed with the caustic alkali, which will give a hydroxid of the metal or metals forming the salts. The hydroxid formed reacts with the acid, or acids, that is generated by the action of the caustic alkali on the starch and probably forms a salt which renders the starch insoluble.

The salts I prefer to use are those giving white oxids, so that when the paste is dried and if oxids of those salts are formed they increase the whiteness of the paste and therefore, enhance its appearance. Furthermore, the salts used are of a character that would produce slimy or gelatinous hydroxids, which would tend to increase the adhesiveness and body of the paste, in addition increasing its waterproof quality. As an example of such salts, I may cite chlorid of zinc.

In preparing the adhesive I may make use of the old well known methods of treating one of the many forms of starch from its various sources, such as tapioca, sago, potatoes, or from other sources, in order to hydrolyze or convert such starch to the point of producing a density flow or viscosity of the degree desired. In such cases I follow former well known methods in grinding, mixing or agitating the selected starch with enough water to produce a paste of the proper consistency. The percentage of water to starch varies with the source and characteristics of the latter.

When the paste solution has been brought to its proper consistency, I add to the same, as in previous well known cases, the necessary percentage of caustic soda or other alkali to digest the starch or hydrolyze it. Thus far I claim no novelty. To the resulting solution I then add from 5% to 50% of a chlorid of zinc, as compared to the weight of the caustic soda used. The quantity of the salt added depends on the desired viscosity of the resulting product, if the same is to be used at once. If it is to be marketed, it is preferably dried. The paste can then be formed by adding a quantity of water to obtain the desired viscosity of paste.

The zinc chlorid added to the hydrolyzed starch forms, probably, a zinc lactate, or a zinc salt of a similar organic acid, formed by the reaction of the starch solution with the caustic soda. The zinc lactate, being sparingly soluble, precipitates and is diffused in the body of the starch. The drying of the starch compound will not alter the zinc lactate, and if it does alter it it will be transformed into a zinc oxid, which is sparingly soluble, thereby not affecting the adhesive when the same is mixed with water to use as a cement.

From the above it will be seen that in my method of subsequent treatment of starch solution salts are introduced which will produce an insoluble salt of an organic acid, which organic acid is produced by the reaction of the salt solution with the starch. It is probable that the acids used are of complex nature and, therefore, it would be impossible to state the exact composition or the exact group to which those acids belong; but at all events, the ultimate fact is that they do produce insoluble compounds which are white and which when heated to a comparatively high temperature may decompose and form oxids which are also sparingly soluble and which are also white. The diffusion of the salts of the organic acids formed by the starch and the added metal produces insoluble compounds which increase the waterproof quality of the adhesive and also adds to its whiteness, enhancing the appearance of the product; and, as has been pointed out, the waterproof quality of the compound is not affected whether the same is marketed as a solution or in dry form.

I claim:

1. An adhesive formed of hydrolyzed starch and a zinc chlorid.
2. An adhesive formed of hydrolyzed starch, a zinc chlorid and an excess of caustic.
3. An adhesive formed of a mixture of starch, water, caustic, and zinc chlorid, there being an excess of caustic in the mixture.
4. The process of making adhesive from starch which consists in mixing starch, water and caustic to form a viscid mass, and adding a zinc chlorid to said viscid mass.
5. The process of making adhesive from starch compounds, which consists in treating the hydrolyzed starch or its derivative with a zinc chlorid.

RAYMOND WELCH TUNNELL.